United States Patent
Izvorski et al.

(10) Patent No.: US 9,860,605 B2
(45) Date of Patent: Jan. 2, 2018

(54) METHOD AND APPARATUS FOR CONTROLLING SOURCE TRANSMISSION RATE FOR VIDEO STREAMING BASED ON QUEUING DELAY

(71) Applicant: GOOGLE INC., Mountain View, CA (US)

(72) Inventors: Alexander Izvorski, San Francisco, CA (US); Deven Raut, Cupertino, CA (US); Makarand Dharmapurikar, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/220,014

(22) Filed: Mar. 19, 2014

(65) Prior Publication Data

US 2014/0369191 A1    Dec. 18, 2014

Related U.S. Application Data (60) Provisional application No. 61/835,469, filed on Jun. 14, 2013.

(51) Int. Cl.
H04N 21/647    (2011.01)

(52) U.S. Cl.
CPC .................. *H04N 21/64738* (2013.01)

(58) Field of Classification Search
CPC ......... H04L 47/10; H04L 47/30; H04L 47/32; H04L 47/11; H04L 47/2416; H04L 47/25; H04L 47/28; G08C 19/16; H04N 21/64738
USPC ........................................................ 370/230
See application file for complete search history.

(56) References Cited

U.S. PATENT DOCUMENTS

| | | | | |
|---|---|---|---|---|
| 7,327,709 | B2 * | 2/2008 | Koo et al. | 370/335 |
| 7,706,403 | B2 * | 4/2010 | Hosein | H04J 3/12 370/395.21 |
| 8,027,267 | B2 * | 9/2011 | Denby | H04L 41/145 370/252 |
| 8,279,884 | B1 * | 10/2012 | Narasimha | H04L 47/22 370/410 |
| 8,345,545 | B2 * | 1/2013 | Kokku | H04L 47/10 370/229 |
| 2009/0164657 | A1 * | 6/2009 | Li | H04L 41/0896 709/233 |
| 2010/0235542 | A1 * | 9/2010 | Visharam et al. | 709/246 |

OTHER PUBLICATIONS

Qui et al, "Performance Enhancement of Incremental Redundancy in Wireless Data Networks by Measurement-based Transmission Control", Sep. 19-22, 1999, Piscataway, NJ, USA, IEEE, US, vol. 1, (Sep. 19, 1999), pp. 517-522, XP010352851 ISBN: 0-7803-5435-4 abstract I. Introduction, II. Incremental redundancy with mode 0.*

(Continued)

*Primary Examiner* — Luat Phung
*Assistant Examiner* — Thomas R Cairns
(74) *Attorney, Agent, or Firm* — Brake Hughes Bellermann LLP (57) ABSTRACT

A method for controlling transmission rate for video streaming based on queuing delay, includes determining a queuing delay for a packet transmitted from a source to a destination over a packet switched network and adjusting a transmission rate of the source in response to the determined queuing delay.

32 Claims, 9 Drawing Sheets

(56) References Cited

OTHER PUBLICATIONS

Qui et al, "Performance Enhancement of Incremental Redundancy in Wireless Data Networks by Measurement-based Transmission Control", Sep. 19-22, 1999, Piscataway, NJ, USA, IEEE, US, vol. 1, (Sep. 19, 1999), pp. 517-522, XP010352851 ISBN: 0-7803-5435-4 abstract 1. Introduction, II. Incremental redundancy with mode 0.*

Qui et al, "Measurement-based admission control with aggregate traffic envelopes," IEEE/ACM Trans. Networking, vol. 9. pp. 199-210. Apr. 2001—p. 201 II.B, p. 204 II.E.3 and p. 210 VI.*

* cited by examiner

FIG. 8

METHOD AND APPARATUS FOR CONTROLLING SOURCE TRANSMISSION RATE FOR VIDEO STREAMING BASED ON QUEUING DELAY

CROSS-REFERENCE TO RELATED APPLICATIONS

The present application claims the benefit of U.S. Provisional Patent Application No. 61/835,469, filed on Jun. 14, 2013, which is hereby incorporated by reference in its entirety.

FIELD OF THE INVENTION

This invention relates to the field of video streaming over packet switched networks, and in particular to a mechanism for controlling source transmission rate based on network queuing delay.

BACKGROUND

Video streaming over packet switched networks allows for the transmission of data in the form of packets across a network. Packet switched networks for video streaming are widely used in the context of gaming and other forms of remote content delivery. Video streaming using packet switched networks involves a source (e.g., server) that transmits data in the form of packets to a destination (e.g., client device) over a network or network device.

Typically a network (e.g., cellular network) or network device (e.g., Wi-Fi router) stores data that cannot be immediately sent from a source to a destination, using queues. Data stored in the queue may then be subsequently forwarded to a destination. Each queue may be associated with a particular traffic flow and each queue may receive and store data packets from a source (e.g., server) for subsequent transmission to a destination (e.g., client device).

Because of the dynamic nature of packet switched networks, the bitrate provided to a particular queue for transmission of its stored data packets to an associated destination may vary over time. For example, when additional traffic flows utilize the network or network device, the bitrate provided to an existing queue may decrease in order to allow for newly added queues to service the additional traffic flows. This may be referred to herein as cross traffic or congestion.

The dynamically changing nature of cross-traffic/congestion leads to an ever-changing bitrate being provided to a particular queue for transmission of its data packets to an associated destination, which may result in queue delay. Queue delay refers to the difference between send and receive time for a packet being transmitted from a source to a destination, less the minimal network transmission time. A source transmitting data packets to a queue at a fixed transmission rate may find that queue delay increases as the bitrate provided to its queue for transmission of data to the destination decreases. This is due to the source continuing to store packets at the network at a fixed rate, even though the network is unable to efficiently forward those stored packets to the destination. Increasing queue delay results in latency being experienced at the destination, which is undesirable in the context of video streaming.

Therefore, there is a need for a mechanism that allows for controlling a source transmission rate in response to queuing delay.

SUMMARY

Embodiments of the invention concern a mechanism for controlling source transmission rate for video streaming in a packet switched network based on network queuing delay. The mechanism involves measuring queuing delay for packets transmitted from a source to a destination and adjusting the source transmission bitrate in response to the measured queuing delay. In this way, the low latency for video streaming may be preserved in the presence of variable amounts of cross traffic and congestion. Likewise, the negative impact of a source's own video traffic on latency may be minimized.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

According to some embodiments, a mechanism is provided for controlling source transmission rate for video streaming in a packet switched network based on network queuing delay. The mechanism involves measuring queuing delay for packets transmitted from a source to a destination and adjusting the source transmission bitrate in response to the measured queuing delay. In this way, the low latency for video streaming may be preserved in the presence of variable amounts of cross traffic and congestion. Likewise, the negative impact of a source's own video traffic on latency may be minimized.

Video streaming over packet switched networks allows for the transmission of data in the form of packets across a network. Packet switched networks are widely used in the context of gaming and other forms of remote content delivery. Video streaming using packet switched networks involves a source (e.g., server) that transmits data in the form of packets to a destination (e.g., client device) over a network or network device.

Figure 1:
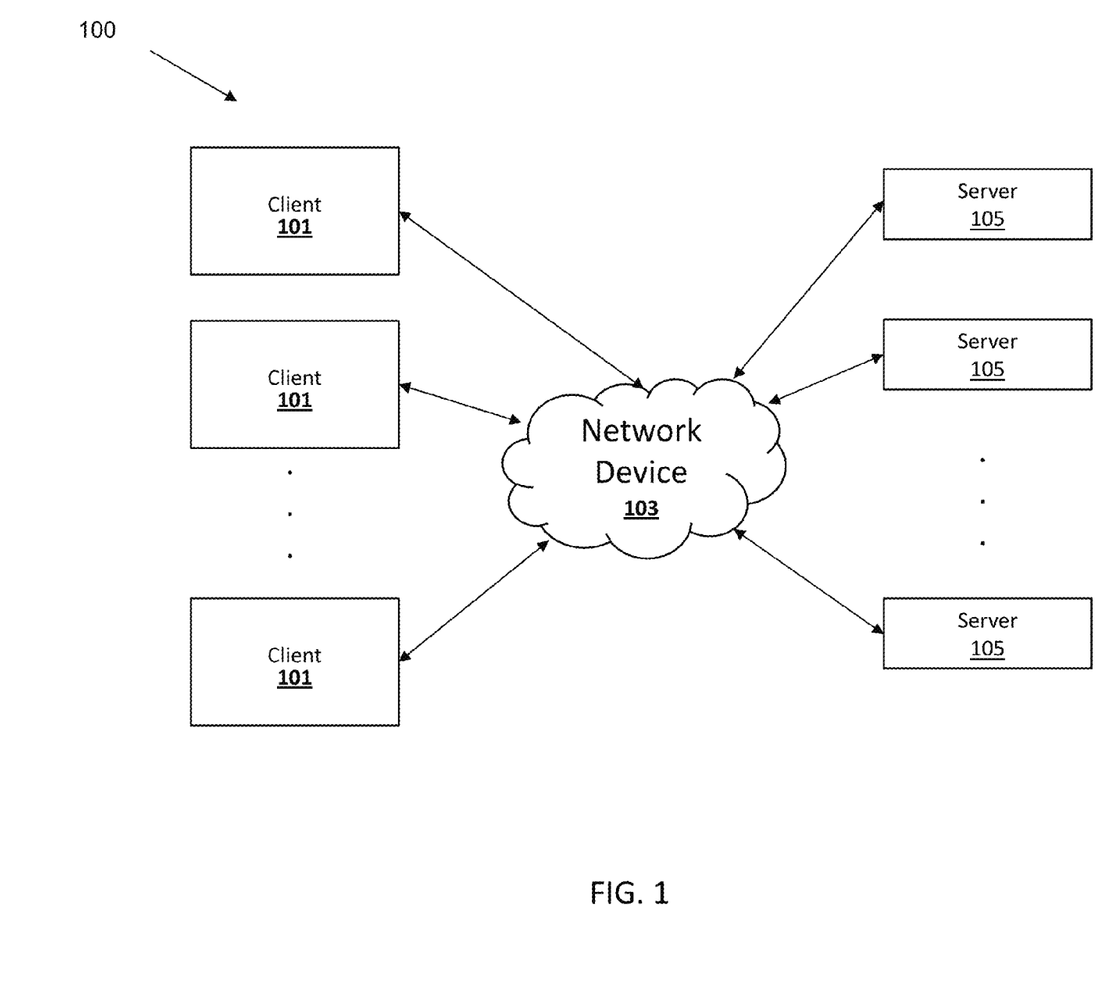
FIG. 1 illustrates an example architecture for video streaming over a packet switched network according to some embodiments.

FIG. 1 illustrates an example architecture for video streaming over a packet switched network according to some embodiments. In FIG. 1, several different sources (e.g., servers) 105 transmit packets to a destination (e.g., client) 101 over a network or network device 103. In some embodiments the network 103 may be a wide area network such as a cellular network. In other embodiments the network device 103 may be a local network device such as a Wi-Fi router. One ordinarily skilled in the art will recognize that the mechanism for controlling source transmission rate for video streaming in a packet switched network based on network queuing delay is applicable for any type of network or network device.

A source (e.g., server) and destination (e.g., client) may have a one-to-one, many-to-one, or one-to-many relationship. Said otherwise, a single source may utilize the network or network device to transmit data to a single client or multiple clients and multiple sources may utilize the network or network device to transmit data to a single client. An example of a many-to-one source/destination relationship may involve several different websites streaming content to a single computer. An example of a one-to-many source/destination relationship may involve a single data center providing game content to several different gaming consoles.

Typically, a network or network device 103 stores data that cannot be immediately sent from a source 105 to a destination 101 using queues. Data stored in the queue may then be subsequently forwarded to a destination 101. Each queue may be associated with a particular traffic flow and each queue may receive data packets from a source 105 (e.g., server) for transmission to a destination 101 (e.g., client device).

Because of the dynamic nature of packet switched networks, the bitrate provided to a particular queue for transmission of its data packets to an associated destination may vary over time. For example, when additional traffic flows utilize the network or network device, the bitrate provided to an existing queue may decrease in order to allow for newly added queues to service the additional traffic flows. This may be referred to herein as cross traffic or congestion.

The dynamically changing nature of cross-traffic/congestion leads to an ever-changing bitrate being provided to a particular queue for transmission of its data packets to an associated destination, which may result in queue delay. Queue delay refers to the difference between send and receive time for a packet being transmitted from a source to a destination, less the minimal network transmission time. A source transmitting data packets to a queue at a fixed transmission rate may find that queue delay increases as the bitrate provided to its queue for transmission of data to the destination decreases. This is due to the source continuing to store packets at the network at a fixed rate, even though the network is unable to efficiently forward those stored packets to the destination. Increasing queue delay results in latency being experienced at the destination, which is undesirable in the context of video streaming.

Figure 2A:
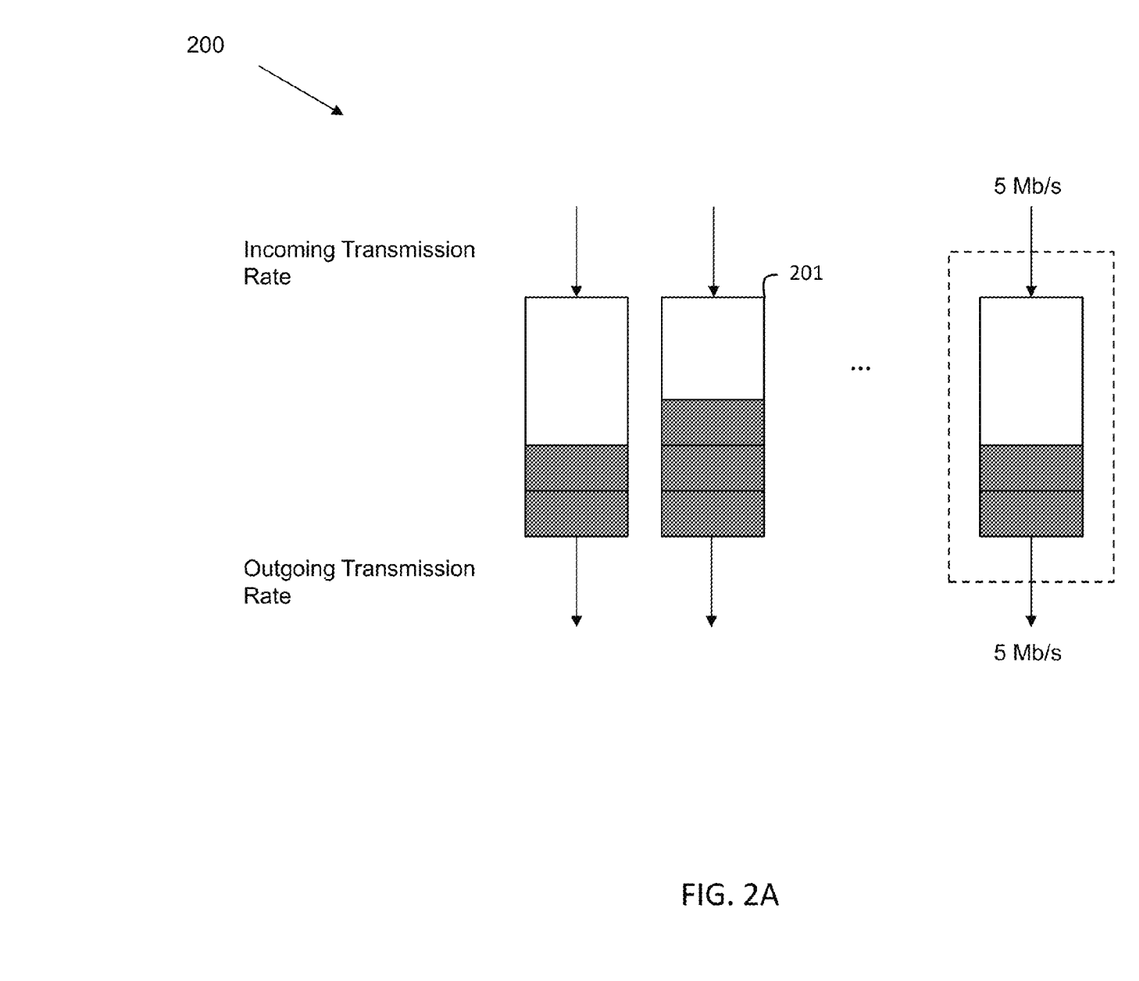
FIGS. 2A and 2B illustrate an example of queuing delay for video streaming in a packet switched network.
Figure 2B:
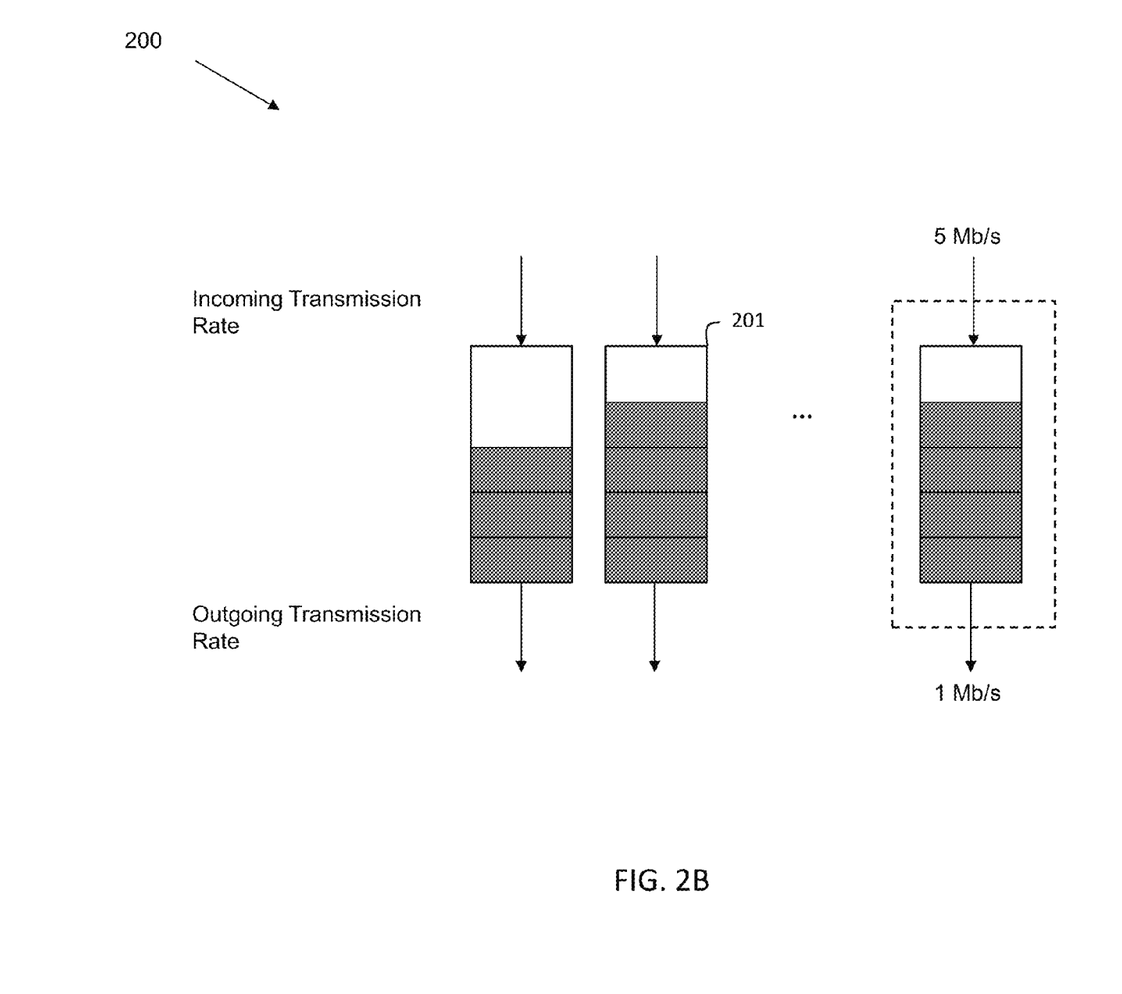

FIGS. 2A and 2B illustrate an example of queuing delay for video streaming in a packet switched network. FIG. 2A illustrates an example network or network device 200 at a first point in time.

The network or network device 200 includes a number of queues 201, each queue servicing a particular traffic flow. Each queue 201 receives data packets from its associated source at a particular source transmission rate (e.g., incoming transmission rate) defined by its associated source (e.g., server). Each queue 201 transmits data packets to its associated destination (e.g., client) at a particular destination receive rate (e.g., outgoing transmission rate) determined by how bitrates are provided by the network or network device 200. For purposes of example, the remainder of the description will focus on the queue surrounded by dashed lines in FIGS. 2A and 2B.

Because of the dynamic nature of cross-traffic/congestion in a packet switched network, the bitrate provided to the queue for transmission of its data packets to an associated destination may vary over time.

For example, at the point in time depicted in FIG. 2A the bitrate provided to the queue for transmission of its data packets is 5 Mb/s. However, over time additional traffic flows (e.g., cross-traffic/congestion) may begin to utilize the network or network device, and the bitrate provided to the queue may decrease in order to allow for newly added queues to service the additional traffic flows. This is illustrated in FIG. 2B, where the bitrate provided to the queue at a later point in time has decreased to 1 Mb/s.

The dynamically changing nature of the bitrate provided to the queue for transmission of its data packets to an associated destination may result in queue delay. A source transmitting data packets to a queue at a fixed transmission rate may find that queue delay increases as the bitrate provided to its queue for transmission of data to the destination decreases. This is illustrated in FIGS. 2A and 2B, where the source is transmitting packets to the queue at a fixed transmission rate of 5 Mb/s. In FIG. 2B, because the bitrate provided to the queue for transmission of its data packets to an associated destination has decreased from 5 Mb/s to 1 Mb/s, the number of data packets residing in the queue begins to grow larger leading to an increase in queue delay for each data packet.

As mentioned above, an increase in queue delay results in latency being experienced at the destination. In order to minimize the negative impact of a source's own traffic on latency and additionally to preserve low latency as much possible in the presence of variable amounts of cross traffic and congestion, the source transmission rate is controlled in response to the network queuing delay.

Figure 3:
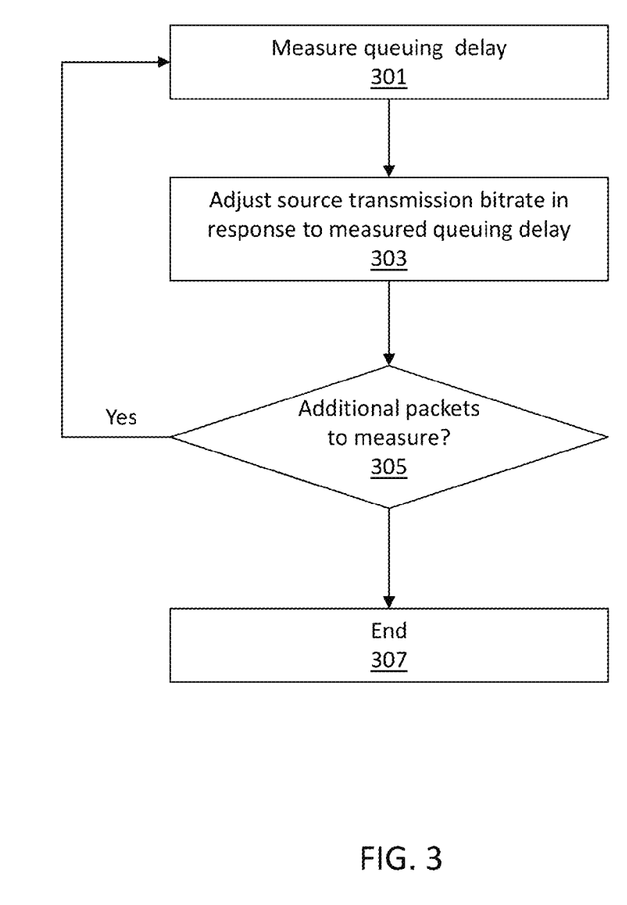
FIG. 3 is a flow diagram illustrating a mechanism for controlling source transmission rate for video streaming based on network queuing delay according to some embodiments of the present invention.

FIG. 3 is a flow diagram illustrating a mechanism for controlling source transmission rate for video streaming based on network queuing delay according to some embodiments of the present invention.

Initially, a queuing delay is determined as shown at 301. As used herein, the term queuing delay refers to the difference between send and receive time for a packet, less the minimal network transmission time.

In some embodiments, the queuing delay can be measured by recording the send and receive timestamps for every packet. In some other embodiments, the queuing delay can be measured by recording the send and receive timestamps for a subset of packets.

In some embodiments, where the source clock and the destination clock are sufficiently synchronized, the timestamps may be subtracted directly. The source clock and destination clock may be synchronized using any method known in the art, for example, Network Time Protocol (NTP).

In some other embodiments, where the source clock and the destination clock are not synchronized, the queuing delay may be estimated using any algorithm which allows for the approximate conversion of timestamps between the source clock and destination clock, or vice versa.

In some embodiments, the queuing delay is measured or estimated at the destination upon receipt of a packet or subset of packets from the source over the packet switched network. The queuing delay may then be transmitted back to the source to create a feedback loop. In some embodiments, the measured/estimated queuing delay may be transmitted from the destination to the server periodically. In other embodiments, the measured/estimated queuing delay may be transmitted from the destination to the server upon receipt of each packet or upon the receipt of a packet that is indicative of the queuing delay exceeding a threshold.

Once the queuing delay has been determined, the source transmission bitrate may be adjusted in response to the queuing delay as shown at 303. Queuing delay directly adds to latency, and as such latency sensitive video streams may benefit from adjusting their transmission bitrate in order to reduce queuing delay thereby reducing latency.

In some embodiments, the source transmission bitrate is reduced to zero or to a very low transmission bitrate when the queuing delay exceeds a particular latency threshold. When the queuing delay lies between zero and the latency threshold, the source transmission bitrate may be adjusted (e.g., increased) so as to utilize as high an effective bit rate as possible while minimizing the probability of exceeding the latency threshold. Additional details regarding how source transmission bitrate is adjusted will be discussed in greater detail below.

In some embodiments, the source transmission bitrate may be adjusted by changing encoding parameters, which in turn affect the bitrate and bitrate/quality tradeoff. In some embodiments, the source transmission bit rate may be adjusted by modifying the bitrate setting of the video encoder being used at the source. In some embodiments, the source transmission bitrate may be adjusted by changing the video resolution or quality setting of video streams being transmitted by the source to the destination using the packet switched network. In some embodiments, the source transmission bit rate may be adjusted by changing the instantaneous frame rate or skipping frames entirely for video streams being transmitted by the source, while leaving all other encoding parameters the same.

By adjusting the source transmission bit rate based on network queuing delay, the low latency for video streaming may be preserved in the presence of variable amounts of cross traffic and congestion. Likewise, the negative impact of a source's own video traffic on latency may be minimized.

After the source transmission bitrate is adjusted, a determination is made as to whether there are additional packets to measure as shown at 305. If there are additional packets to measure, then the process returns to 301. If, however, there are no additional packets to measure, the process ends as shown at 307.

Figure 4:
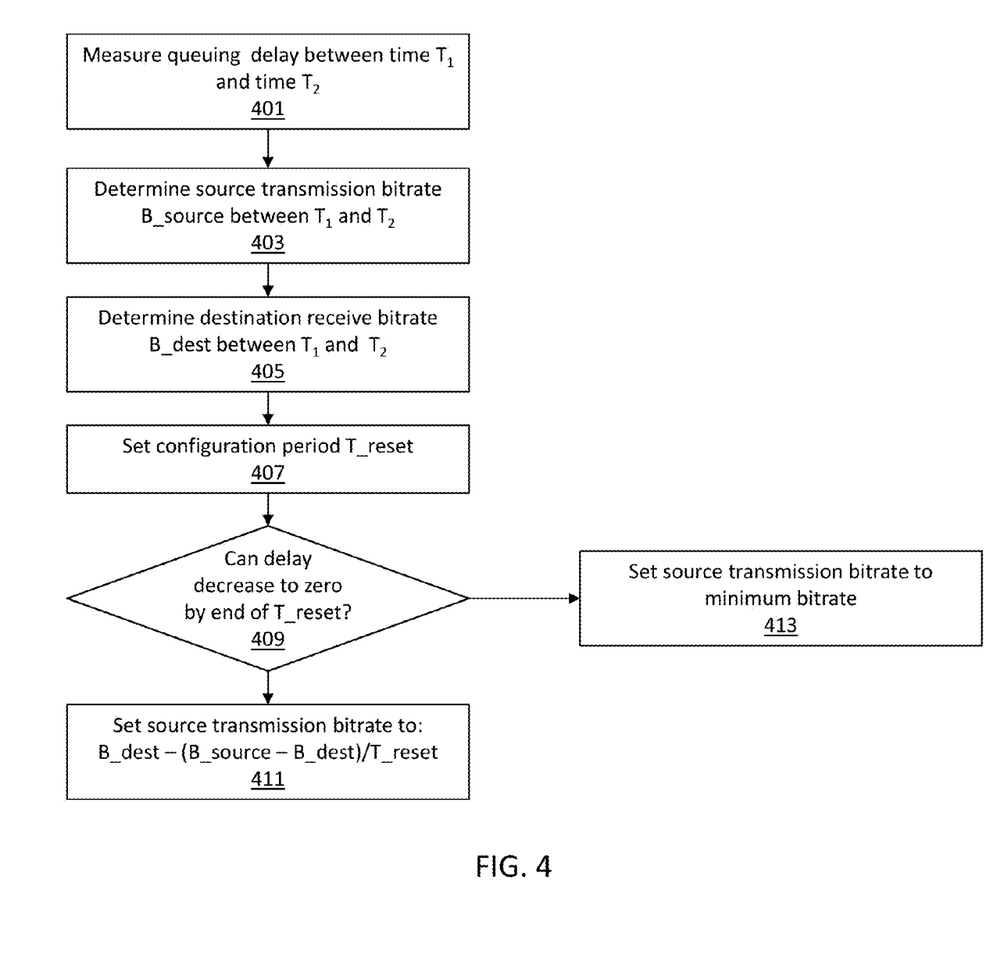
FIG. 4 is a flow diagram illustrating a mechanism for adjusting source transmission bitrate where the network queuing delay grows gradually over time according to some embodiments.
Figure 5:
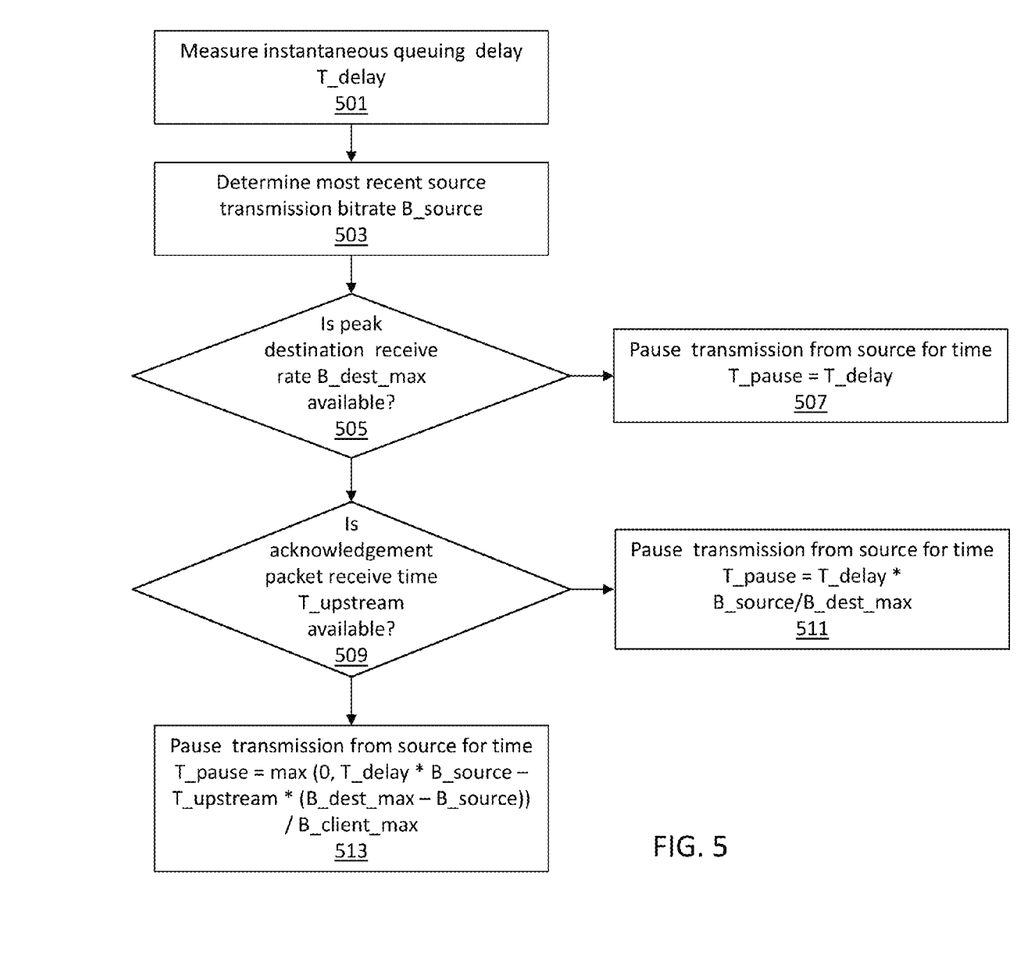
FIG. 5 is a flow diagram illustrating a mechanism for adjusting source transmission bitrate where the network queuing delay spikes instantly between successive packets according to some embodiments.
Figure 6:
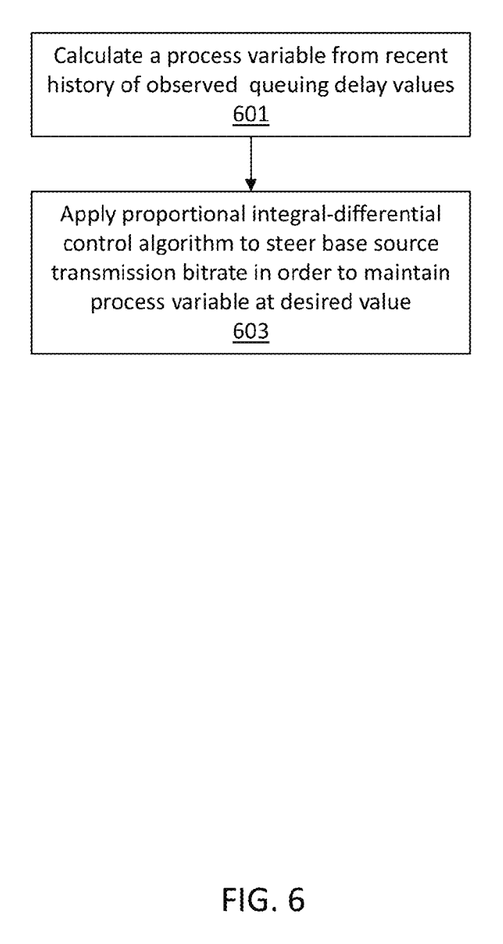
FIG. 6 is a flow diagram illustrating a mechanism for setting a base source transmission bit rate according to some embodiments.

Various different mechanisms for adjusting source transmission bitrate based on network queuing delay may be implemented. FIGS. 4, 5 and 6 illustrate three exemplary mechanisms for adjusting source transmission bitrate based on network queuing delay.

FIG. 4 is a flow diagram illustrating a mechanism for adjusting source transmission bitrate where the network queuing delay grows gradually over time according to some embodiments. This mechanism is most appropriate for the situation where steady state or near-steady state cross-traffic is present on the network.

This mechanism for adjusting source transmission bitrate based on network queuing delay may be applied to the situation where a certain amount of queuing delay accumulates between a first time $T_1$ and a second time $T_2$. Initially a source transmission bitrate B_source is determined for the time period between $T_1$ and $T_2$ as shown at 401. The source transmission bitrate B_source represents the bit rate at which the source is transmitting data packets to the network during the time period from $T_1$ to $T_2$.

A destination receive bitrate B_dest is also determined for the time period between $T_1$ and $T_2$ as shown at 405. The destination receive bitrate B_dest represents the bit rate at which the network is transmitting data packets to the destination (or similarly the bit rate at which the destination is receiving data packets from the network) during the time period from $T_1$ to $T_2$.

A configuration period T_reset is then set as shown at 407. The configuration period T_reset represents the amount of time for the network queuing delay to reach a suitable level (e.g., zero). In some embodiments, the configuration period may be set by an administrator at the source. A suitable configuration period may be set between 1 and 10 seconds.

A determination is then made as to whether the network queuing delay can decrease to zero within the configuration period T_reset as shown at 409. If the network queuing delay can decrease to zero within the configuration period T_reset, then the source transmission bitrate is set to: B_dest−(B_source−B_dest)/T_reset as shown at 411. If however, the network queuing delay cannot decrease to zero within the configuration period T_reset (e.g., the above formula results in a negative bitrate), the source transmission bitrate may instead be set to a minimum bitrate as shown at 413. In some embodiments, the minimum bit rate may be predetermined and set at a level guaranteed to decrease queue delay.

Thus, the mechanism for adjusting source transmission bitrate depicted in FIG. 4 may be utilized to make small adjustments to the source transmission bitrate to gradually lower network queuing delay over a configuration period where the network queuing delay is accumulated gradually.

FIG. 5 is a flow diagram illustrating a mechanism for adjusting source transmission bitrate where the network queuing delay spikes instantly between successive packets according to some embodiments. This mechanism for adjusting source transmission bitrate based on network queuing delay may be applied to the situation where a certain increase in network queuing delay T_delay occurs instantly between transmissions of successive packets.

Because of the instantaneous spike in network queuing delay, the transmission of data from the source is paused or the source transmission rate significantly lowered for a period of time to reduce network queue delay.

The mechanism begins by initially measuring an instantaneous queuing delay T_delay as shown at 501. In some embodiments, the instantaneous queuing delay may be measured when it is observed that the network queuing delay of a data packet or subset of data packets is significantly greater than the network queuing delay of its preceding data packet or subset of data packets.

A most recent source transmission bitrate B_source is then determined as shown at 503. The most recent source transmission bitrate B_source represents the source transmission bitrate at the time the spike in network queuing delay occurred.

A determination is then made as to whether a peak destination receive rate B_dest_max is available as shown at 505. The peak destination receive rate B_dest_max represents the peak receive rate at which a network queue is drained and may be determined by observing the destination receive rate during a time period where there is a relatively substantial decrease in network queuing delay.

When the peak destination receive rate B_dest_max is unknown, it may be assumed that the peak destination receive rate B_dest_max is equal to or greater than the source transmission bitrate B_source, and data transmission from the source may be paused or the source transmission bitrate lowered to a predetermined value for a time period T_pause equal to the instantaneous queuing delay T_delay as shown at 507. In some embodiments, the predetermined value may be set at a level guaranteed to decrease queue delay.

If however, the peak destination receive rate B_dest_max is available, then a determination is made as to whether an acknowledgement packet receive time T_upstream is available as shown at 509. In some embodiments, the destination provides acknowledgement of the receipt of a packet with high delay in the form of an acknowledgement packet. The acknowledgement packet receive time T_upstream indicates the time it takes for the destination to provide acknowledgement of the receipt of a packet with high delay from the source.

If the acknowledgment packet receive time is unknown, then data transmission from the source may be paused or the source transmission rate lowered to a predetermined value for a time period T_pause equal to: T_delay*(B_source/B_dest_max) as shown at 511. When the source transmission bitrate is lowered to a minimum value B_source_min rather than pausing data transmission from the source, the element B_dest_max in the above equation is replaced with B_dest_max−B_source_min. In some embodiments, the predetermined value may be set at a level guaranteed to decrease queue delay.

If the acknowledgement packet receive time is known, then data transmission from the source may be paused or the source transmission rate lowered for a time period T_pause equal to: max (0, T_delay*B_source−T_upstream*(B_dest_max−B_source))/B_client_max as shown at 513. When the source transmission bitrate is lowered to a minimum value B_source_min rather than pausing data transmission from the source, the element B_dest_max in the above equation is replaced with B_dest_max−B_source_min. In some embodiments, the predetermined value may be set at a level guaranteed to decrease queue delay.

One variation of the above mechanism occurs when the destination sends an acknowledgement packet to the source at regular intervals T_acknowledgement, regardless of whether a packet with high delay or not is received. In this situation, when the destination has not received a packet during a latest acknowledgement interval, the source may respond immediately based on the fact that the packet would be delayed by at least the acknowledgement interval. The above formulas may still be utilized in these situations with the element T_delay replaced by T_acknowledgement. In some embodiments, a suitable value for the acknowledgement interval T_acknowledgement may be on the order of ⅕ to ½ times the peak latency tolerated by the application.

Thus, the mechanism for adjusting source transmission bitrate depicted in FIG. 5 may be utilized to make large adjustments to the source transmission bitrate or pause transmission from the source for a period of time in response to an instant spike in queuing delay.

While FIGS. 4 and 5 depict mechanisms for responding to gradual and instantaneous increases in network queuing delay, they do not provide guidance as to what base source transmission bitrate to use when the network queuing delay does not require immediate action.

The bitrate in such situations may be set to a source application's preferred value or to a value chosen based on existing knowledge about the network (e.g., provisioned bitrate for a connection). However, using these techniques to set the base source transmission bit rate may lead to undesirable oscillations in the case of variable cross traffic.

FIG. 6 is a flow diagram illustrating a mechanism for setting a base source transmission bit rate according to some embodiments. This mechanism is most suited for the situation where the amount of network queuing delay does not require immediate action.

Initially, a process variable is calculated from a recent history of queuing delay values as shown at 601.

In some embodiments, this process variable may be the average of queuing delays in a certain period. In some embodiments, the process variable may be the number of times the queuing delays exceeded a threshold over a given period of time. In some embodiments, the process variable may be the number of times that one of the other algorithms adjusted the source transmission bitrate in a given period of time.

In other embodiments, this process variable may be the weighted average of queuing delays in a certain period. The weighting function may give large weights to large delays. For example, the weighted delay may be equal to: power (delay, alpha) where alpha>1.

Once the process variable has been calculated, a proportional integral-differential control algorithm may be applied to steer the base source transmission bitrate to a level for maintaining the process variable at a desired level as shown at 603.

Under steady state conditions, the mechanism depicted in FIG. 6 is applied to gradually use more the amount of available bitrate for the source until the process variable begins to show that queuing delays and latency are nearing an unacceptable level. The source transmission bitrate is then stabilized around that value. In the situation where a network is associated with rapidly variable conditions, this algorithm would generate a base source transmission bitrate which provides a tradeoff between average throughput and peak latency.

By adjusting source transmission bit rate based on network queuing delay, the low latency for video streaming may be preserved in the presence of variable amounts of cross traffic and congestion. Likewise, the negative impact of a source's own video traffic on latency may be minimized.

Additionally, by calculating various process variables from observed queuing delay values, the amount of available bitrate for the source may be continuously utilized in a gradual manner until the process variable begins to show that queuing delays and latency are nearing an unacceptable level, thereby providing an acceptable tradeoff between average throughput and peak latency.

Figure 7:
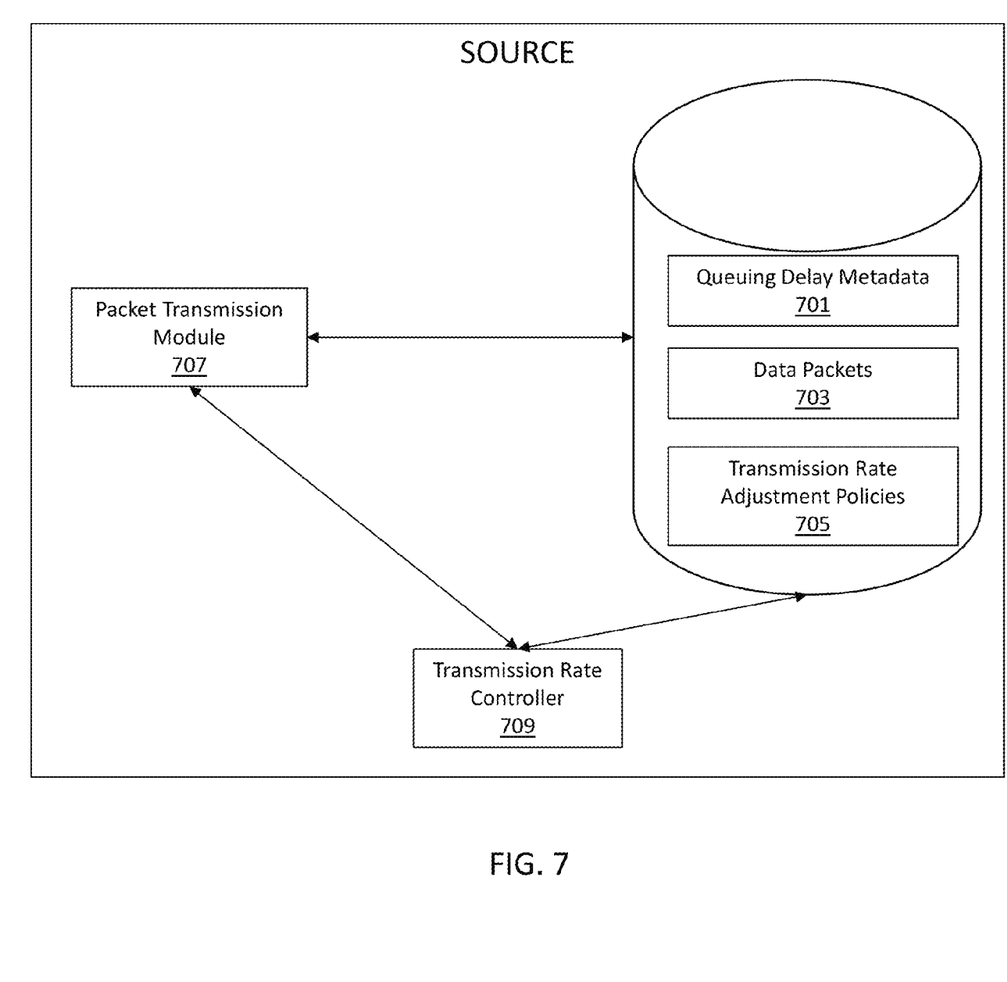
FIG. 7 is schematic diagram illustrating a system for controlling source transmission rate for video streaming based on network queuing delay according to some embodiments of the present invention.

FIG. 7 is schematic diagram illustrating a system for controlling source transmission rate for video streaming based on network queuing delay according to some embodiments of the present invention.

While the above description has been described in the context of video streaming, one ordinarily skilled in the art will recognize that the above mechanisms for controlling source transmission rate based on queuing delay may be applied to any type data transmission using packet switched networks.

SYSTEM ARCHITECTURE

Figure 8:
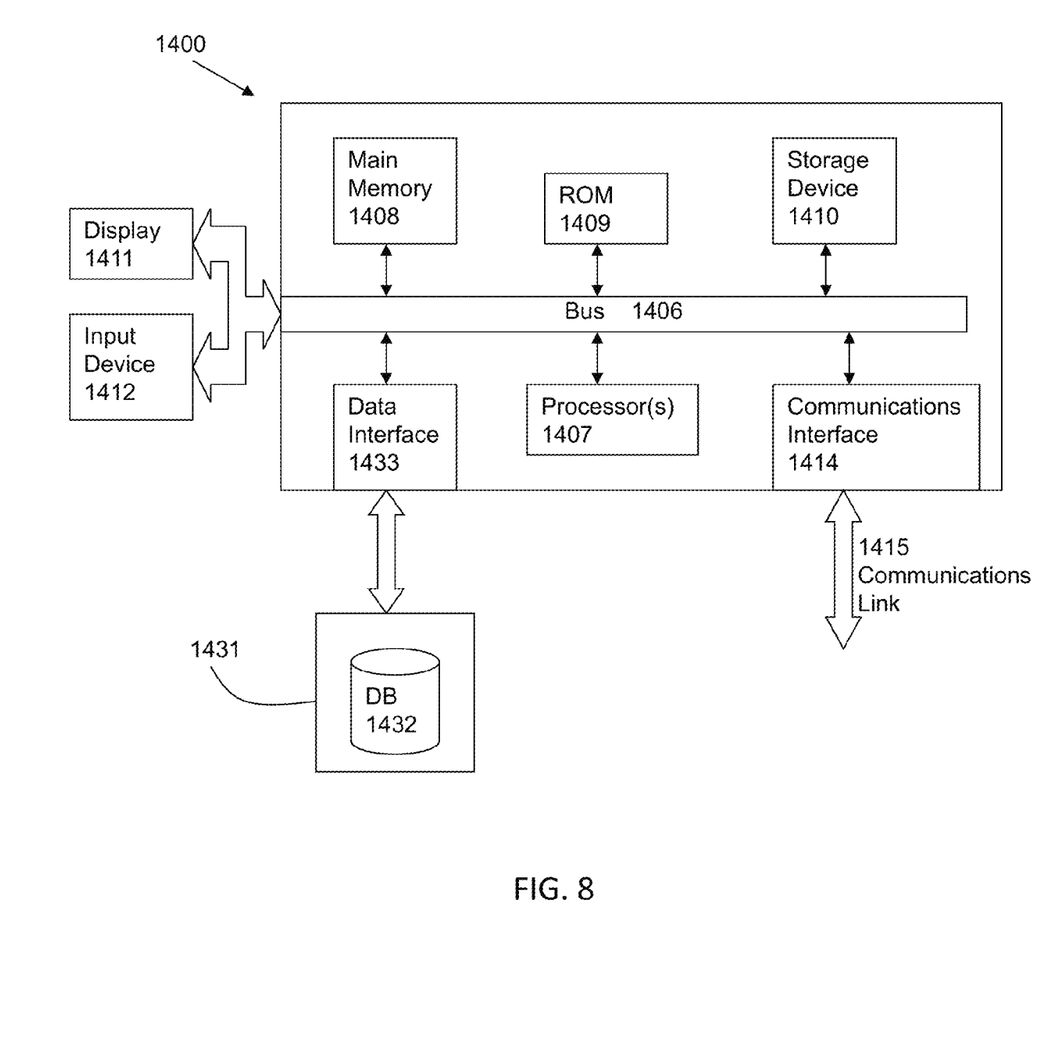
FIG. 8 is a block diagram of an illustrative computing system suitable for implementing some embodiments of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for controlling transmission rate for video streaming from a source to a destination based on a receive queuing delay, the method comprising:
   determining a peak destination receive rate (B_dest_max);
   determining a most recent source transmission bitrate (B_source);
   determining the receive queuing delay (T_delay) for a packet transmitted from the source to the destination over a packet switched network; and
   adjusting a source transmission rate by lowering the source transmission rate to a predetermined value (B_source_min) for a time period equal to:

$T\_delay*(B\_source/(B\_dest\_max-B\_source\_min))$.

2. The method of claim 1, wherein the receive queuing delay is measured by recording a send timestamp and a receive timestamp for the packet.

3. The method of claim 1, wherein the receive queuing delay is determined for a subset of packets being transmitted from the source to the destination over the packet switched network.

4. The method of claim 1, wherein the receive queuing delay is determined at the destination and subsequently transmitted to the source.

5. The method of claim 4, wherein the receive queuing delay is transmitted to the source periodically.

6. The method of claim 4, wherein the receive queuing delay is transmitted to the source when the receive queuing delay exceeds a threshold.

7. The method of claim 1, wherein the source transmission rate is adjusted in response to the determined receive queuing delay growing gradually over a time period between a time ($T_1$) and a time ($T_2$).

8. The method of claim 1, wherein the source transmission rate is adjusted in response to the determined receive queuing delay spiking instantly between successive packets.

9. The method of claim 1, wherein transmission from the source is paused or the source transmission rate is lowered to the predetermined value (B_source_min) for a time period equal to the receive queuing delay (T_delay) when the peak destination receive rate is unavailable.

10. The method of claim 1, wherein transmission from the source is paused for a time period equal to:

$T\_delay*(B\_source/B\_dest\_max)$.

11. The method of claim 1, further comprising:
determining an acknowledgement packet receive time (T_upstream).

12. The method of claim 11, wherein transmission from the source is paused for a time period equal to:

$$\max(0, T\_delay * B\_source - (T\_upstream * (B\_dest\_max - B\_source)))/B\_dest\_max.$$

13. The method of claim 11, wherein transmission from the source is lowered to the predetermined value (B_source_min) for a time period equal to:

$$\max(0, T\_delay * B\_source - (T\_upstream * (B\_dest\_max - B\_source\_min - B\_source)))/(B\_dest\_max - B\_source\_min).$$

14. The method of claim 1, wherein the adjusting the source transmission rate comprises:
calculating a process variable from a recent history of receive queuing delay values; and
applying a proportional integral-differential control algorithm to steer the source transmission rate to a value suitable for maintaining the process variable at a desired level.

15. A computer program product embodied on a non-transitory computer readable medium, the computer readable medium having stored thereon a sequence of instructions which, when executed by a processor causes the processor to control transmission rate for video streaming from a source to a destination based on a receive queuing delay by:
determining a peak destination receive rate (B_dest_max);
determining a recent source transmission bitrate (B_source);
receiving from the destination the receive queuing delay (T_delay) measured at the destination for a packet transmitted from the source to the destination over a packet switched network; and
transmitting another packet at a source transmission rate determined at the source in response to the received measured receive queuing delay by lowering the source transmission rate to a predetermined value (B_source_min) for a time period equal to:

$$T\_delay * (B\_source/(B\_dest\_max - B\_source\_min)).$$

16. The computer program product of claim 15, wherein the receive queuing delay is measured by recording a send timestamp and a receive timestamp for the packet.

17. The computer program product of claim 15, wherein the receive queuing delay is determined for a subset of packets being transmitted from the source to the destination over the packet switched network.

18. The computer program product of claim 15, wherein the receive queuing delay is received at the source periodically.

19. The computer program product of claim 15, wherein the receive queuing delay is received at the source when the receive queuing delay exceeds a threshold.

20. The computer program product of claim 15, wherein the source transmission rate is adjusted in response to the determined receive queuing delay growing gradually over a time period between a time ($T_1$) and a time ($T_2$).

21. The computer program product of claim 20, wherein the source transmission rate is adjusted in response to the determined receive queuing delay spiking instantly between successive packets.

22. The computer program product of claim 21, wherein the instructions further cause the processor to control the transmission rate by:
pausing transmission from the source or lowering the source transmission rate to the predetermined value (B_source_min) for a time period based on the instantaneous receive queuing delay (T_delay).

23. The computer program product of claim 15, wherein transmission from the source is paused or the source transmission rate is lowered to the predetermined value (B_source_min) for a time period equal to the receive queuing delay (T_delay) when the peak destination receive rate is unavailable.

24. The computer program product of claim 15, wherein determining the most recent source transmission rate comprises receiving the recent source transmission bitrate (B_source).

25. The computer program product of claim 15, wherein transmission from the source is paused for a time period equal to:

$$T\_delay * (B\_source/B\_dest\_max).$$

26. The computer program product of claim 24, further comprising:
determining an acknowledgement packet receive time (T_upstream).

27. The computer program product of claim 26, wherein transmission from the source is paused for a time period equal to:

$$\max(0, T\_delay * B\_source - (T\_upstream * (B\_dest\_max - B\_source)))/B\_dest\_max.$$

28. The computer program product of claim 26, wherein transmission from the source is lowered to the predetermined value (B_source_min) for a time period equal to:

$$\max(0, T\_delay * B\_source - (T\_upstream * (B\_dest\_max - B\_source\_min - B\_source)))/(B\_dest\_max - B\_source\_min).$$

29. The computer program product of claim 15, wherein the adjusting the source transmission rate, comprises:
calculating a process variable from a recent history of receive queuing delay values; and
applying a proportional integral-differential control algorithm to steer the source transmission rate to a value suitable for maintaining the process variable at a desired level.

30. A system at a source for controlling transmission rate for video streaming from the source to a destination based on a receive queuing delay, comprising:
a non-transitory memory having stored therein:
receive queuing delay metadata associated with a packet switched network;
data packets for transmission; and
source transmission rate adjustment policies;
a transmission rate controller coupled with the memory to obtain the metadata and the policies, and programmed to determine a source transmission rate based on the metadata, the policies, and a measured receive queuing delay received from the destination, the source transmission rate determined by:
determining a peak destination receive rate (B_dest_max);
determining a most recent source transmission bitrate (B_source);
determining a receive queue queuing delay (T_delay) from the receiving queuing delay metadata; and adjusting a source transmission rate by lowering the source transmission rate to a predetermined value (B_source_min) for a time period equal to:

$$T\_delay * (B\_source/(B\_dest\_max - B\_source\_min));$$
and a packet transmission rate module to transmit the data packets across the packet switched network according to the source transmission rate.

31. The method of claim 1, wherein the adjusting the source transmission rate of the source in response to the determined receive queuing delay comprises adjusting an encoding parameter of a video encoder.

32. The method of claim 31, where the encoding parameter comprises at least one of a bitrate parameter, a video resolution parameter, a quality parameter, a frame rate parameter, or a frame skip parameter.

* * * * *

UNITED STATES PATENT AND TRADEMARK OFFICE
CERTIFICATE OF CORRECTION

PATENT NO. : 9,860,605 B2
APPLICATION NO. : 14/220014
DATED : January 2, 2018
INVENTOR(S) : Izvorski et al.

Page 1 of 1

It is certified that error appears in the above-identified patent and that said Letters Patent is hereby corrected as shown below:

On the Title Page

Column 2, Item (56), under "OTHER PUBLICATIONS", Line 1, delete "Qui" and insert -- Qiu --, therefor.

On Page 2, Column 1, Item (56), under "OTHER PUBLICATIONS", Lines 1-6, delete "Qui et al, "Performance Enhancement of Incremental Redundancy in Wireless Data Networks by Measurement-based Transmission Control", Sep. 19-22, 1999, Piscataway, NJ, USA, IEEE, US, vol. 1, (Sep. 19, 1999), pp. 517-522, XP010352851 ISBN: 0-7803-5435-4 abstract 1. Introduction, II. Incremental redundancy with mode 0.".

On Page 2, Column 1, Item (56), under "OTHER PUBLICATIONS", Line 1, delete "Qui" and insert -- Qiu --, therefor.

Signed and Sealed this
Fourth Day of December, 2018

Andrei Iancu
*Director of the United States Patent and Trademark Office*